(12) United States Patent
Kumar et al.

(10) Patent No.: US 6,237,064 B1
(45) Date of Patent: *May 22, 2001

(54) CACHE MEMORY WITH REDUCED LATENCY

(75) Inventors: Harsh Kumar, Freemont; Gunjeet D. Baweja, Sunnyvale; Cheng-Feng Chang, Cupertino, all of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,539

(22) Filed: Feb. 23, 1998

(51) Int. Cl.[7] .............................. G06F 12/00; G06F 12/08
(52) U.S. Cl. ............................................. 711/122; 711/146
(58) Field of Search .................................... 711/122, 146; 395/287

(56) References Cited

U.S. PATENT DOCUMENTS

| | | | |
|---|---|---|---|
| 5,249,282 | * | 9/1993 | Segers ................................... 711/122 |
| 5,577,227 | * | 11/1996 | Finnell et al. ......................... 711/122 |
| 5,623,632 | * | 4/1997 | Liu et al. .............................. 711/144 |
| 5,745,729 | * | 4/1998 | Greenley et al. .................... 711/131 |
| 5,943,686 | * | 8/1999 | Arimilli et al. ...................... 711/146 |

* cited by examiner

Primary Examiner—Matthew Kim
Assistant Examiner—Matthew D. Anderson
(74) Attorney, Agent, or Firm—Blakely, Sokoloff, Taylor & Zafman LLP

(57) ABSTRACT

The present invention provides a method and a data processing system for accessing a memory of a data processing system, the data processing system including a first and at least a second level memory for storing information. The method includes issuing a memory request to the first level memory, and issuing the memory request to the second level memory at substantially the same time the memory request is issued to the first level memory.

19 Claims, 3 Drawing Sheets

CACHE MEMORY WITH REDUCED LATENCY

BACKGROUND OF THE INVENTION

1. Field of the Invention

This invention relates generally to the field of data processing systems, and, more particularly, to cache memory used in data processing systems. Specifically, the present invention relates to a cache memory with reduced latency.

2. Description of the Related Art

The demand for quicker and more powerful personal computers has led to many technological advances in the computer industry, including the development of faster memories. Historically, the performance of a personal computer has been directly linked to the efficiency by which data can be accessed from memory, often referred to as the memory access time. Generally, the performance of a central processing unit (CPU or microprocessor), which functions at a high speed, has been hindered by slow memory access times. Therefore, to expedite the access to main memory data, cache memories have been developed for storing frequently used information.

A cache is a relatively small high-speed memory that is used to hold the contents of the most recently utilized blocks of main storage. A cache bridges the gap between fast processor cycle time and slow memory access time. Using this very fast memory, the microprocessor can reduce the number of wait states that are interposed during memory accesses. When the processor issues the load instructions to the cache, the cache checks its contents to determine if the data is present. If the data is already present in the cache (termed a "hit"), the data is forwarded to the CPU with practically no wait. If, however, the data is not present (termed a "miss"), the cache must retrieve the data from a slower, secondary memory source, which may be the main memory or another cache, in a multi-level cache memory system. In addition, the retrieved information is also copied (i.e. stored) into the cache memory so that it is readily available to the microprocessor for future use.

Most cache memories have a similar physical structure. Caches generally have two major subsystems, a tag subsystem (also referred to as a cache tag array) and memory subsystem (also known as cache data array). A tag subsystem holds the addresses and determines where there is a match for a requested datum, and a memory subsystem stores and delivers the data upon request. Thus, typically, each tag entry is associated with a data array entry, where each tag entry stores index information relating to each data array entry. Some data processing systems have several cache memories (i.e. a multi-level cache system), in which case, each data array will have a corresponding tag array to store addresses.

Utilizing a multi-level cache memory system can generally improve the proficiency of a central processing unit. In a multi-level cache infrastructure, a series of caches L0, L1, L2 can be linked together, where each cache is accessed serially by the microprocessor. For example, in a three-level cache system, the microprocessor will first access the L0 cache for data, and in case of a miss, it will access cache L1. If L1 does not contain the data, it will access the L2 cache before accessing the main memory. Since caches are typically smaller and faster than the main memory, the general trend is to design modem computers using a multi-level cache system.

Even a multi-level cache system, however, can sometimes hamper the performance of a computer because of the serial manner in which the caches in a multi-level cache system are accessed. The overall cache latency of the multi-level cache system tends to be high because each cache performs a lookup of a memory request before forwarding the memory request to the next level cache. Thus, what is needed is a method and apparatus for reducing the overall cache latency of a cache memory system.

The present invention is directed to overcoming, or at least reducing the effects of, one or more of the problems set forth above.

SUMMARY OF THE INVENTION

In one aspect of the present invention, a method is provided for accessing a memory of a data processing system, the data processing system including a first and at least a second level memory for storing information. The method includes issuing a memory request to the first level memory, and issuing the memory request to the second level memory at substantially the same time the memory request is issued to the first level memory.

In another aspect of the instant invention, a data processing system is provided having a first level memory, at least a second level memory, and an execution unit adapted to issue a memory request to the first level memory and adapted to issue the memory request at substantially the same time to the second level memory.

BRIEF DESCRIPTION OF THE DRAWINGS

Other objects and advantages of the invention will become apparent upon reading the following detailed description and upon reference to the drawings in which.

Figure 1:
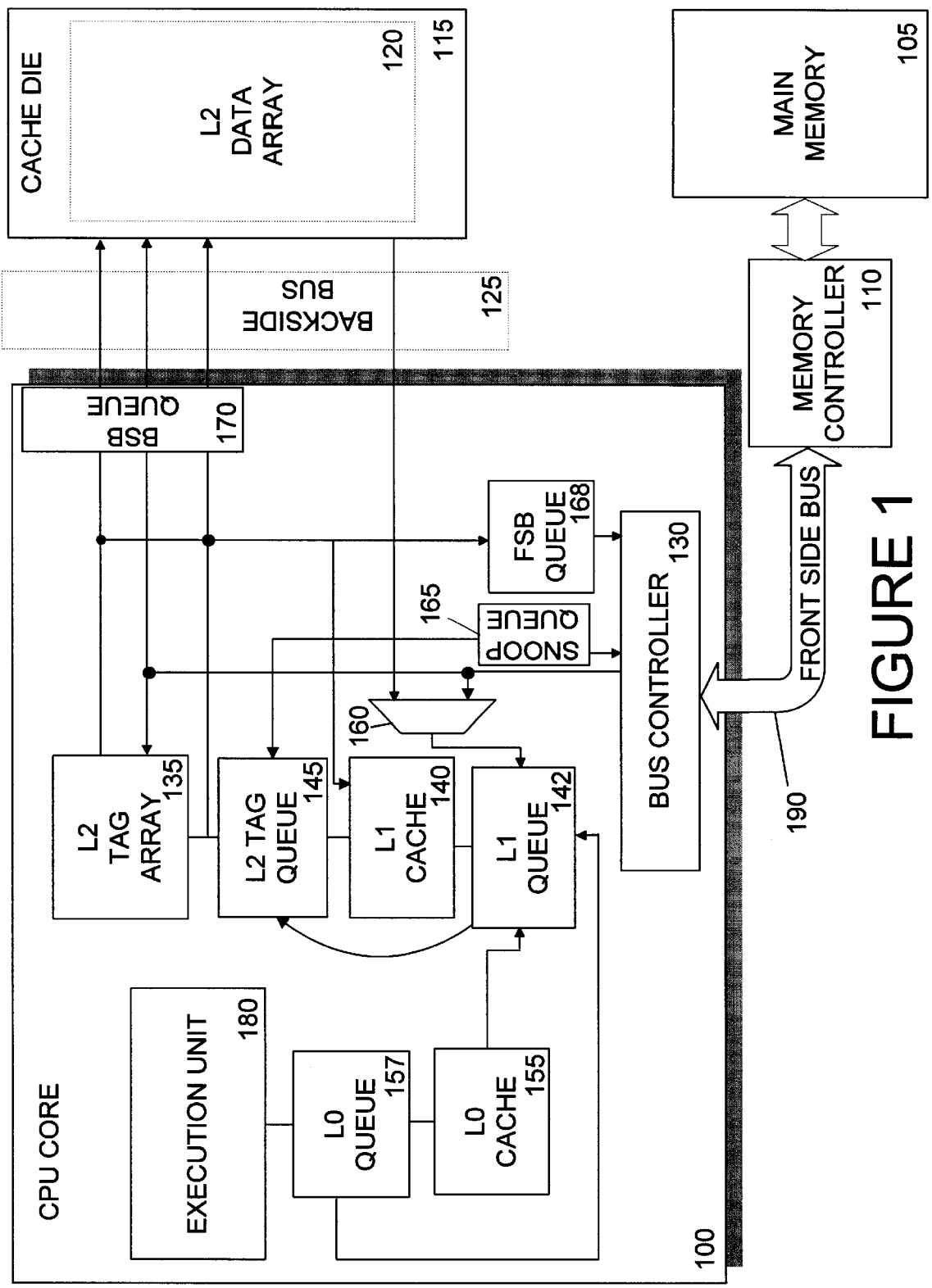
FIG. 1 is a block diagram of an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

With reference now to the figures, and in particular to FIG. 1, there is shown an embodiment of the present invention, which includes a CPU core 100, a main memory 105, a memory controller 110, a cache die 115, an L2 data array 120, a backside bus 125, a bus controller 130, an L2 tag array 135, an L1 cache 140, an L1 cache queue 142, an L2 tag queue 145, a backside bus (BSB) queue 170, an L0 cache 155, an L0 cache queue 157, a multiplexer 160, a snoop queue 165, a frontside bus (FSB) queue 168, and an execution unit 180.

FIG. 1 illustrates a three-level pipelined cache memory architecture, where the first level cache, L0, 155, the second level cache, L1, 140, and the L2 tag array 135 of the third level cache, L2, reside on the CPU core 100. The L2 cache data array 120 is off the CPU core 100, and is resident on the cache die 115. The L2 data array 120 is coupled to the CPU core 100 by a backside bus 125. The main memory 105 is coupled to the memory controller 110, which is further coupled to the bus controller 130 over the front side bus 190.

The L0, L1, L2 tag, BSB, and the FSB queues 157, 142, 145, 170, and 168 hold and track memory requests issued by the execution unit 180 to the L0 cache, L1 cache, L2 tag array, L2 data array, and main memory, 155, 140, 135, 120, and 105, respectively. Each queued memory transaction held in the L0, L1, L2 tag, BSB, or the FSB queue 157, 142, 145, 170, and 168 may have other associated entries such as the memory address, access type (i.e. read/write), and a variety of status bits (i.e. priority bit, hit/miss bit, invalidate bit, etc.). It should be apparent to those skilled in the art that the particulars of a queue may vary from one configuration to another, depending on the system requirements and design.

Figure 2A:
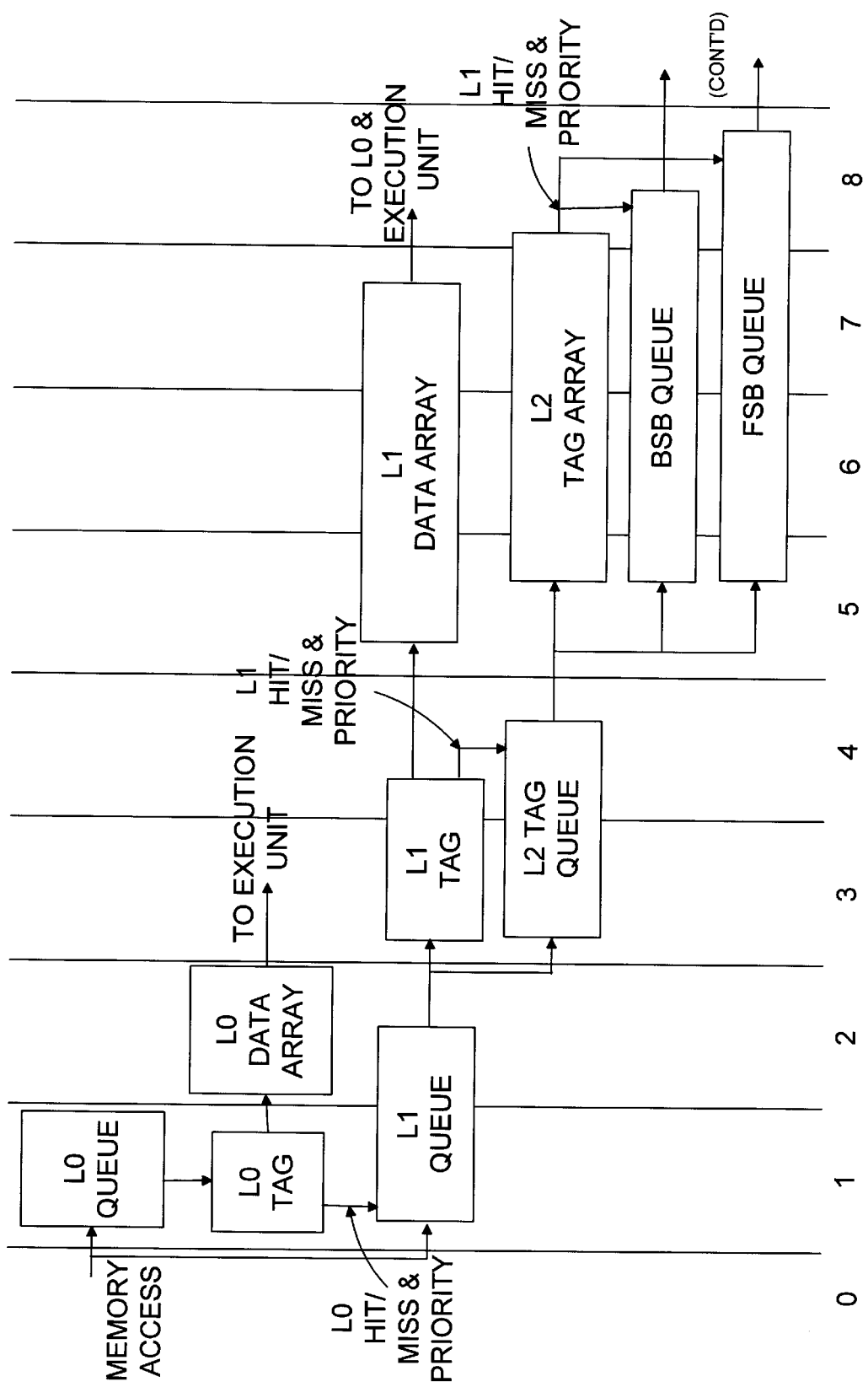
FIG. 2A is a pipeline diagram of the embodiment of FIG. 1 in accordance with the method and system of the present invention.
Figure 2B:
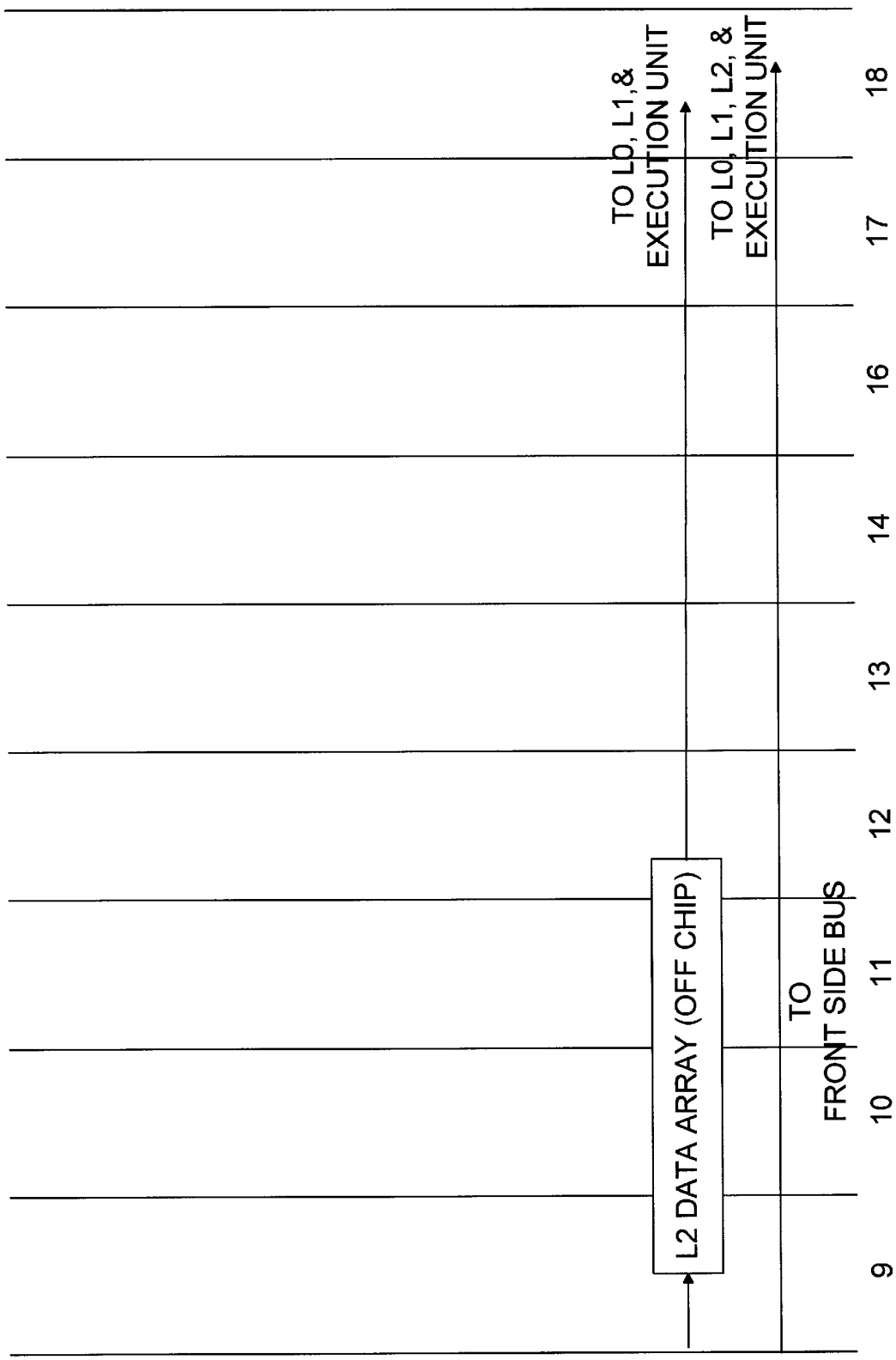
FIG. 2B is a continuation of the pipeline diagram of FIG. 2A.

The present invention substantially deserializes the method in which the execution unit 180 accesses information from the caches 135, 140, 155 and the main memory 105. The present invention can be better illustrated with reference to FIGS. 2A and 2B, which depict a pipeline diagram of the three-level cache memory architecture of FIG. 1 in accordance with the method and apparatus of the present invention. As can be seen, FIG. 2B is a continuation of the pipeline diagram of FIG. 2A, and, hence, both figures combined represent all the stages of the pipeline diagram of the cache memory architecture of FIG. 1.

The present invention reduces cache latency by paralleling various memory accesses initiated by the execution unit 180. At stage 0, the execution unit 180 issues a memory request to the L0 queue 157 of the L0 cache 155, which receives the request during stage 1 of the pipeline 300. To reduce latency, and thereby conserve clock cycles, the same memory request is simultaneously issued to the next-level cache memory, the L1 queue 142 of the L1 cache 140. In the prior art, the L1 cache 140 would receive the memory request only after it was processed by the L0 cache 155. At stage 1, an L0 tag (not shown) of the L0 cache 155 determines whether the memory request was a hit or a miss, and passes that information to the L1 queue 142. The L0 tag of the L0 cache 155 may also pass other information to the L1 queue 142 as well, such as the priority of the memory request, for example. Alternatively, a priority level of a memory request can also be propagated to the L1 queue directly from the execution unit 180, as opposed to from the L0 tag of the L0 cache 155. A queue in general processes memory requests/transactions based on their priority, where the transaction having the highest priority is processed first.

At stages 2 and 3, the L1 queue 142 forwards the memory request to an L1 tag (not shown) of the L1 cache 140, as well as to the L2 tag queue 145 of the L2 tag array 135. At stage 4, the L1 tag of the L1 cache 140 determines whether the memory request was a hit or a miss, and passes that information to the L2 tag queue 145. The priority of the memory request may also be passed to the L2 tag queue 145.

At stage 5, the L2 tag array 135, BSB queue 170, and FSB queue 168 receive the memory request from the L2 tag queue 145. During stages 6 through 8, the L2 tag array 135 determines whether the memory request was a hit or a miss, and passes that information to the BSB and the FSB queues 170, 168. The priority of the memory request may also be transmitted to the BSB and FSB queues 170, 168. The BSB queue 170 tracks the memory requests submitted to the off-chip L2 data array 120 of the L2 cache, while the FSB queue 168 tracks the memory requests submitted to the main memory 105.

As can be seen from the pipeline diagram, the execution unit 180 issues the memory request to the current-level memory and the next-level memory in parallel, thus reducing the overall memory latency. In accordance with the present invention, a control logic (not shown) of each queue tracks all the memory requests/transactions. The control logic is capable of dequeuing a memory request or ignoring the information retrieved if the information is found earlier in the memory hierarchy.

One possible control logic algorithm may be as follows: If the requested information is found (i.e. a hit) in the L0 cache 155, then the information will be directly forwarded from the L0 data array (not shown) of the L0 cache 155 to the execution unit 180, as seen in stages 2 and 3 of the pipeline 300. In addition, because the requested information has already been supplied to the execution unit 180, the corresponding memory request currently pending in the subsequent memory levels (i.e. L1, L2 tag, BSB, and FSB queues 142, 145, 170, 168) will be aborted (i.e. dequeued). If, however, one or more of the subsequent memory levels process the memory request before it can be dequeued, then the retrieved information will be ignored by the control logic of the queues that receive the information.

If the requested information is not found (i.e. a miss) in the L0 cache 155 but is in the L1 cache (i.e. a hit) 140, then the information will be fetched from the L1 data array (not shown) of the L1 cache 140 and forwarded to the execution unit 180 as well as to the L0 cache 155, as shown in stages 7 and 8 of the pipeline 300. Any outstanding memory requests in the L2 tag, BSB, or FSB queues 145, 170, 168 will be aborted, if possible. If the requested information is retrieved from the subsequent memory levels before the memory requests are aborted, then the control logic of the queue receiving the information will ignore the retrieved information.

If the requested information is a miss in the L0 and L1 caches 155, 140 but is a hit in the L2 tag array 135, then the information will be fetched from the L2 data array 120 and forwarded to the execution unit 180 as well as to the L0 and L1 caches 155, 140, as shown in stages 12 through 18 of the pipeline 300. Any outstanding memory requests in the FSB queue 168 will be aborted, if possible. If the requested information is retrieved from the main memory 105 before the memory request in the FSB queue 168 can be aborted, then the control logic of the FSB queue 168 will ignore the retrieved information.

If the requested information does not reside in the L0, L1, or L2 caches (i.e. L2 tag array) 155, 140, 135 then the information will be fetched from the main memory 105 and forwarded to the execution unit as well as to the L0, L1, and L2 caches 155, 140, 135, as shown in stages 8 through 18 of the pipeline 300.

To ensure that the caches 155, 140, 135 and main memory 105 are coherent, the present invention includes snoop logic (not shown) that monitors all the addresses that are snooped, and if it determines a match to any pending memory accesses in the cache queues 157, 142, 145, 170, 168, then the snoop logic will invalidate that entry in the cache queue 157, 142, 145, 170, 168. The queue control logic will ignore any pending entry that was invalidated by the snoop logic.

It should be noted that the present invention of reducing cache latency is applicable to any cache memory architecture and is not limited to the cache memory architecture of FIG. 1. For example, although FIG. 1 illustrates a three-level cache memory architecture, the present invention is applicable to any variety of cache levels, regardless of whether a particular cache tag and its corresponding data array reside "on" or "off" the CPU core 100. Furthermore, although the present invention reduces cache latency by utilizing queues 157, 142, 145, 170, 168 having the requisite control logic, it is envisioned that it is also possible to reduce cache latency without queues 157, 142, 145, 170, 168 by implementing similar control logic elsewhere in the cache memory architecture.

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed is:

1. A method for accessing a memory of a data processing system, comprising:

issuing a memory request to a first level memory and a second level memory at substantially the same time;

retrieving information from both the first and second level memories if there were hits in both the first and second level memories in response to the memory request; and subsequently ignoring the information retrieved from the second level memory.

2. The method of claim 1, wherein issuing a memory request to the first level memory comprises issuing to a first queue of the first level memory.

3. The method of claim 2, wherein issuing a memory request to the second level memory comprises issuing to a second queue of the second level memory.

4. The method of claim 3, further comprising determining whether the memory request corresponds to an entry in the first level memory.

5. The method of claim 4, further comprising forwarding information in response to the memory request to an execution unit if the memory request corresponds to an entry in the first level memory.

6. The method of claim 3, further comprising:

monitoring snoop addresses; and determining if a snoop address corresponds to an entry in the first queue and the second queue.

7. The method of claim 6, further comprising invalidating the entry in the first queue and the second queue if the entry corresponds to the snoop address.

8. The method of claim 1, further comprising issuing the memory request to a third level memory at substantially the same time the memory request is issued to the second level memory.

9. An apparatus, comprising:

a first level memory;

a second level memory; and an execution unit coupled to the first and second level memories to issue a memory request to the first and second level memories at substantially the same time, to retrieve information from both the first and second level memories if there were hits in both the first and second level memories in response to the request, and to subsequently ignore the information retrieved from the second level memory.

10. The apparatus of claim 9, further comprising a first queue of the first level memory, wherein the execution unit is to issue the memory request to the first queue of the first level memory.

11. The apparatus of claim 9, further comprising a second queue of the second level memory, wherein the execution unit is to issue the memory request to the second queue of the second level memory.

12. The apparatus of claim 9, further comprising snoop logic to monitor snoop addresses, determine if one the snoop addresses corresponds to an entry in the first queue and the second queue, and invalidate the entry in the first queue and the second queue if the entry corresponds to one of the snoop addresses.

13. The apparatus of claim 9, wherein the first level memory is a cache memory.

14. The apparatus of claim 9, wherein the second level memory is a cache memory.

15. The apparatus of claim 9, further comprising a third level memory, wherein the third level memory is a cache memory.

16. The apparatus of claim 15, further including a fourth level memory, wherein the a fourth level memory is a main memory.

17. A computer system, comprising:

a main memory;

a memory controller coupled to the main memory; and a CPU core coupled to the memory controller and including:

a first level cache memory;

a second level cache memory; and an execution unit coupled to the first and second level cache memories to issue a memory request to the first and second level memories at substantially the same time, to retrieve information from both the first and second level memories if there was a hit in both the first and second level memories in response to the request, and to subsequently ignore the information retrieved from the second level memory.

18. The computer system of claim 17, wherein the first level cache memory includes a first queue to receive the memory request issued from the execution unit.

19. The computer system of claim 17, wherein the second level cache memory includes a second queue to receive the memory request issued from the execution unit.

\* \* \* \* \*